Dec. 15, 1959     D. GRAY     2,917,744
SENSE ANTENNA
Filed Oct. 25, 1955
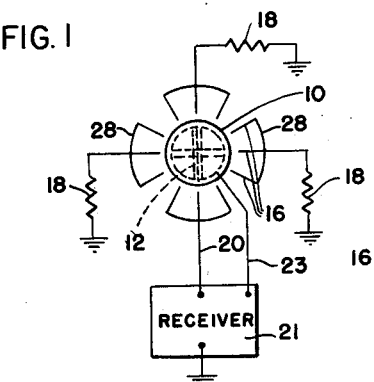
FIG. I
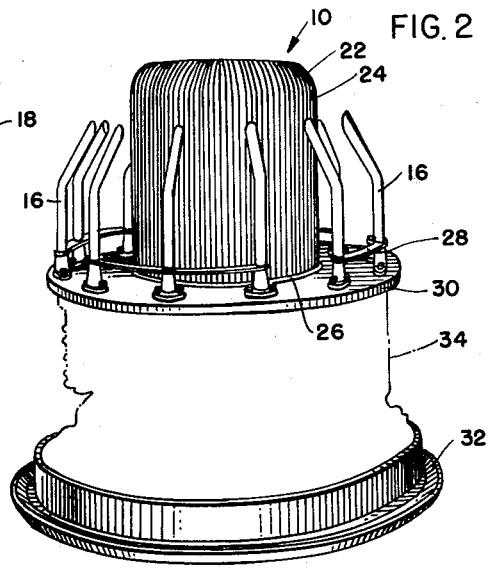
FIG. 2
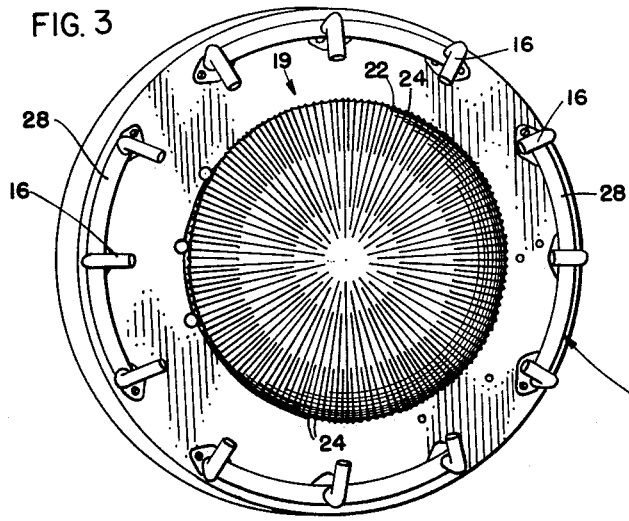
FIG. 3
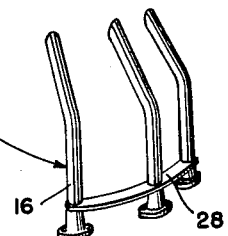
FIG. 4
INVENTOR:
DUDLEY GRAY
BY
*By Ahlberg, Hupper & Gradolph*
ATT'YS.

2,917,744
Patented Dec. 15, 1959

2,917,744
SENSE ANTENNA

Dudley Gray, Chicago, Ill., assignor to Stewart-Warner Corporation, Chicago, Ill., a corporation of Virginia Application October 25, 1955, Serial No. 542,557

4 Claims. (Cl. 343—728)

The invention relates generally to radio direction finding apparatus, and more particularly to an antenna construction whereby the direction and sense of incoming radiation may readily be determined.

It is the object of the invention to provide an improved sense antenna for use in direction finding apparatus, which is simple in construction and reliable in operation.

Other objects will become apparent from the following description, reference being had to the accompanying drawings, in which:

Fig. 1 is a schematic wiring diagram of the antenna array;

Fig. 2 is a perspective view of the sense antenna array shown associated with the electrostatic shielding housing for the rotary directional antenna;

Fig. 3 is a perspective view, substantially in plan, of the apparatus shown in Fig. 2; and Fig. 4 is a perspective view of one section of the sense antenna array.

In direction finding apparatus it is obviously of importance not only to determine the direction of a received radio signal, which can readily be determined by a rotating loop or similar structure and associated apparatus, but also to determine the sense of the direction from which the signal is being received, that is, whether it is from a point at a certain number of degrees azimuth, or from a point spaced 180° therefrom. The present invention provides an improved antenna array which will provide voltages to the receiving apparatus from which the sense of the received signal may readily be determined.

It is thus the primary object of the invention to provide an improved antenna array for use in radio direction finding apparatus whereby the sense and direction from which electromagnetic radiation is being received may readily be determined and indicated.

The circuit diagram of Fig. 1 illustrates the general principles of the invention and shows an electrostatically shielded housing 10 in which a loop antenna 12 is rotated to obtain a variable voltage, which when coordinated with the instantaneous position of the loop antenna will provide an indication of the direction from which a radio signal tuned to the frequency of the radio receiver is being received. This rotating loop antenna does not, however, provide a signal from which the sense of the direction from which the signal is being received may be determined. In other words, the signal provided by the loop antenna is ambiguous as to whether the received signal is from a point at a certain azimuthal direction or from a point 180° displaced.

To provide means for furnishing a voltage which, with the voltage provided by the loop antenna, may be utilized in suitable apparatus to indicate the sense of the direction from which the signal is being received, a suitable antenna array comprising four groups of antennas 16 is provided. These groups of antennas 16 are located about the electrostatically shielded housing 10 at 90° intervals, and are spaced so that the individual antennas are 30° apart. Three adjacent groups of the antennas 16 are parasitic antennas and are respectively connected to ground through load resistors 18. The fourth group of these antennas 16 is connected by a conductor 20 to a radio receiving apparatus 21 to provide a signal, the amplitude and phase of which, when compared with the signal picked up by the loop antenna and transmitted to the receiver 21 through conductor 23, is indicative of the sense from which the signal is received.

In general, the electronic apparatus coupled to the rotary direction antenna 12 may be of the type shown in the patent to R. W. Lockhart No. 2,656,536, which will, upon an oscilloscope, produce a propeller-like pattern indicating the direction, but not the sense, of a received signal, as shown in Fig. 3 of said patent. However, by utilization of the signal appearing upon the conductor 20, this pattern on the oscilloscope may be changed to provide an indication of the sense of the source (original or reflected) from which the signal is being received. When the radiation is received from a source having a directional component passing through the antennas 16 connected to the receiver 21, the voltages from these antennas will be additive with respect to the voltages from the loop antenna, and vice versa, so that indications of the sense of the origin of the electromagnetic radiation may be obtained.

More particularly, the electrostatically shielded housing 10 comprises an inverted plastic cup-shaped member 22 having a plurality of conductors 24 embedded therein, preferably at the outer surface thereof, the lower ends of which are electrically connected to a grounded ring 26.

Symmetrically spaced at 90° intervals around the housing 10, are the four groups of three antenna elements 16 which are preferably in tubular form, the three antennas of each group being connected by a position maintaining and conducting arcuate strip 28, three of which, as indicated in Fig. 1, are connected to ground respectively through resistors 18, and the fourth of which is connected to conductor 20 leading to the receiving apparatus. The impedances of the resistors 18 approximate the input impedance of the receiver 21 so as to maintain a uniform field in the proximity of the loop antenna 12. These antenna groups are suitably secured to but insulated from ground plate 30, which in turn is supported by a base ring 32 mechanically connected to the plate 30 to support the latter by a housing element 34 which may contain the drive mechanism for rotating the loop antenna 12. The base 32 is adapted to be secured in sealed relation to a radome housing enclosing all of the mechanism shown in Fig. 2.

The electrostatic shielding housing 10 is constructed upon the principle, and has the advantages of, the antenna shield which is more specifically shown and described in the patent to Bryan et al. No. 2,401,480, although the specific construction differs considerably therefrom.

The invention is preferably employed in conjunction with elements of the sense antenna system disclosed in applicant's prior application, Serial No. 442,826, filed July 12, 1954.

The parasitic antennas 16 which are connected to ground through the resistors 18 are effective to maintain a uniform field around the loop antenna 12, so that the signals picked up by the latter will not be distorted by the sense antennas 16 which are connected to the receiver 21, thus assuring accurate directional sensitivity of the loop antenna. The impedance of resistors 18 is made comparable to that of the input impedance of the receiver.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A sense antenna array for use with direction finding radio apparatus, which includes a rotating loop antenna, comprising a plurality of similar groups of electrically interconnected antennas spaced symmetrically around the rotating antenna so as to intercept radio frequency radiation directed toward the loop antenna, means connecting to ground all except one group of antennas, and means for conducting a signal from the one group to a radio receiving apparatus to provide a signal useful to determine the sense from which the signal is received.

2. A sense antenna array for use with direction finding radio apparatus, which includes a rotating loop antenna, comprising a plurality of antennas spaced equally and symmetrically around the rotating antenna so as to intercept radio frequency radiation directed toward the loop antenna, impedances connecting to ground a majority of the antennas, and means for conducting a signal from the remaining antennas to a radio receiving apparatus to provide a signal usable to determine the sense from which the signal is received.

3. A sense antenna array for use with direction finding radio apparatus, which includes a loop antenna surrounded by an electrostatic shield and rotating on a vertical axis, comprising a plurality of groups of electrically interconnected generally vertical sense antennas spaced symmetrically around the rotating antenna so as to intercept radio frequency radiation directed toward the loop antenna, impedances respectively connecting to ground all except one group of sense antennas, and means for conducting a signal from the ungrounded group to a radio receiving apparatus to provide a signal usable to determine the sense from which the signal is received.

4. A sense antenna array for use with direction finding radio apparatus, which includes a rotating loop antenna comprising a plurality of similar groups of antennas spaced symmetrically around the rotating antenna so as to intercept radio frequency radiation directed toward the loop antenna, means for mixing in said direction finding apparatus the signal output of one of said groups with the signal output of said loop to provide a composite signal to determine the sense from which the signal is received, a plurality of impedance elements, and means connecting all of the remaining groups of antennas to a common reference point each through a different impedance element to present substantially the same impedance to each of the remaining groups as is presented to the one group by the direction finding apparatus.

References Cited in the file of this patent

UNITED STATES PATENTS

| | | |
|---|---|---|
| 2,448,036 | Libby | Aug. 31, 1948 |
| 2,770,800 | Lundberg | Nov. 13, 1956 |